United States Patent [19]

Suzuki et al.

[11] Patent Number: 4,668,084
[45] Date of Patent: May 26, 1987

[54] DISTANCE MEASURING EQUIPMENT

[75] Inventors: Kiziro Suzuki; Takashi Tsutsumi, both of Tokyo; Shotaro Yokoyama; Takashi Nishibe, both of Yokosuka, all of Japan

[73] Assignees: Konishiroku Photo Industry Co., Ltd.; Fuji Electric Company, Ltd.; Fuji Electric Corporate Research and Development Ltd., all of Japan

[21] Appl. No.: 634,700

[22] Filed: Jul. 26, 1984

[30] Foreign Application Priority Data

Aug. 9, 1983 [JP] Japan ............................ 58-145548
Aug. 9, 1983 [JP] Japan ............................ 58-145549

[51] Int. Cl.⁴ ............................ G01C 3/24; G03B 3/00
[52] U.S. Cl. ............................ 356/1; 354/403
[58] Field of Search ............. 356/1, 4; 354/408, 403

[56] References Cited

U.S. PATENT DOCUMENTS 3,945,023 3/1976 Stauffer .............................. 354/408
4,189,232 2/1980 Asano et al. ...................... 356/1
4,387,988 6/1983 Matsuda et al. .................. 356/1
4,410,261 10/1983 Masunaga et al. ............... 356/1

Primary Examiner—Stephen C. Buczinski
Assistant Examiner—Linda J. Wallace
Attorney, Agent, or Firm—Jordan B. Bierman

[57] ABSTRACT

A distance measuring equipment wherein two images of an object are received on photosensor arrays each, two image data rows indicating a luminous intensity distribution in the object are compared with each other, and a distance to the object is measured from a mutual shift rate of both the signal rows which is required for bringing both the signal rows into coincidence at high correlation. A presence of the shift rate whereat the both image data rows indicate a high correlation is detected when it is present plurally, a part of the plural shift rate including a shift rate corresponding to the highest correlation is stored and taken.

25 Claims, 17 Drawing Figures

FIG. I
PRIOR ART
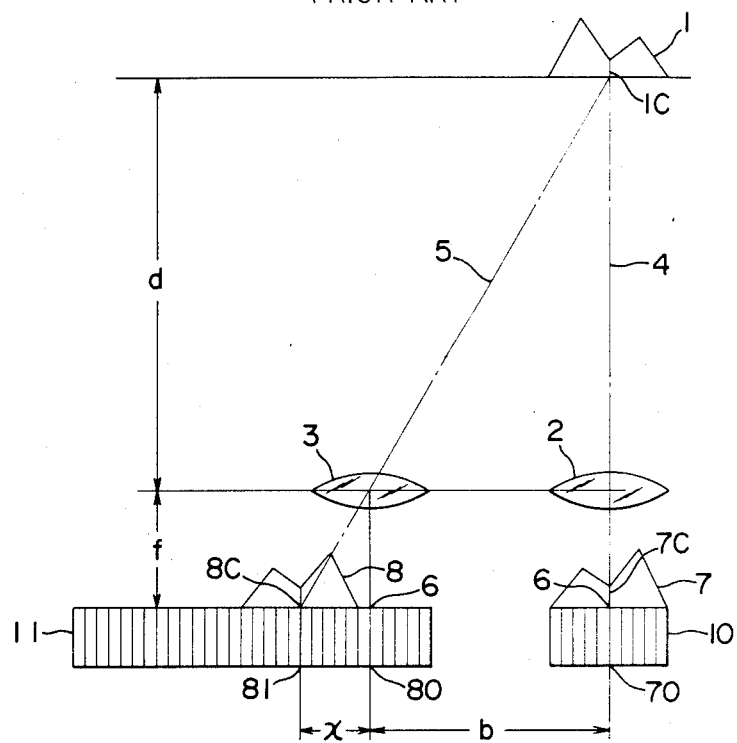
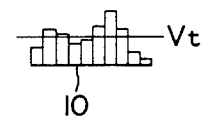
FIG. 2(a)
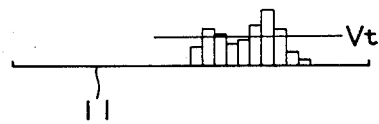
FIG. 2(b)
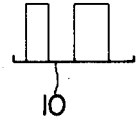
FIG. 2(c)
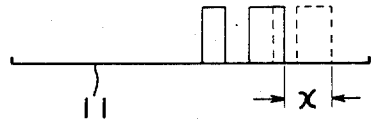
FIG. 2(d)

ced along two different optical paths on photoelectric sensor arrays each; two image data rows which represent a luminous intensity distribution in the object are obtainable by quantizing image signals operated by the images are compared with each other, and a distance to the object is measured or estimated from a mutual shift rate of both signal rows which is required for coordinating both signal rows at high correlation.

DISTANCE MEASURING EQUIPMENT

BACKGROUND OF THE INVENTION

1. Field of the Invention

This invention relates to distance measuring equipment, and is particularly concerned with distance measuring equipment wherein two images of an object are received along two different optical paths on photoelectric sensor arrays each; two image data rows which represent a luminous intensity distribution in the object are obtainable by quantizing image signals operated by the images are compared with each other, and a distance to the object is measured or estimated from a mutual shift rate of both signal rows which is required for coordinating both signal rows at high correlation.

2. Description of the Prior Art

The distance measuring equipment described above has been known for a fairly long time, however, there is currently provided a device wherein no moving part is totally incorporated; that is, a full electronic type equipment, which is duly appreciated as miniature, cheap and high precision distance measuring equipment.

A principle of this kind of equipment is shown in FIG. 1 and FIG. 2. In FIG. 1, a light emitted from an object 1 subjected to measurement of a distance d thereto, or, for example, the sunshine reflected from the object is incident on a pair of small lenses 2, 3 along two different optical paths 4 and 5. These lenses having a short focal distance f, are incorporated in an optical instrument, having a base distance b therebetween. The object 1 has a luminous intensity distribution given in two triangles as illustrated, and images 7, 8 of the object having such luminous intensity distribution are formed on a focal plane 6 through the small lenses 2, 3. To make the description easy to understand, a center of the object 1, namely a center 1C of the luminous intensity distribution faces in front of the small lens 2, a center 7C of the image 7 on the focal plane 6 through the small lens 2 comes at a position indicated by 70, and the image center position 70 does not change regardless of a change in the distance d to the object 1. On the other hand, as will be easily understood a center 8C of the image 8 formed through the small lens 3 is kept at a position 80, on the focal plane 6 facing to the lens 3, when the distance d to the object 1 is infinite. However, it is dislocated leftward in the illustration in accordance as the distance d to the object 1 becomes short, and thus the center 8C of the image comes to a position 81 apart from the original position 80 by a distance x on the focal plane 6 as illustrated.

Now, there are provided, on the focal plane 6, photosensor arrays 10, 11 for receiving the images 7, 8 of the object 1 through the small lenses 2, 3 each. The photosensor arrays 10, 11 generally consist of mutually different and m, n pieces of photoelectromotive force elements or photosensitive resistance elements each, and each element of the arrays generates an electrical signal relating or proportional, for example, to the quantity of light received as shown in FIGS. 2(a), 2(b). Now, if the distance x of the above-mentioned dislocation can be measured on some means, then the distance d to the object 1 will be obtainable through an expression:

$$d = b \cdot f / x$$

according to a simple principle of triangular surveying.

Then, a signal obtained from each element of the photosensor arrays 10, 11 has an analog value shown in FIGS. 2(a), 2(b), and a distribution of the output signal along each photosensor array has a step-like pattern as illustrated. The analog value can be used straight for obtaining the distance x of the above-mentioned dislocation, however, it is normally quantized to a digital value for simplifying and improving precision of an electronic circuit. As the simplest means for quantization, the analog value is compared with an appropriate threshold voltage Vt as shown in FIGS. 2(a), 2(b), then the analog value greater than the threshold value Vt is given at "1" and that of less than the threshold is given at "0", which are converted into one-bit digital values as shown in FIGS. 2(c), 2(d). Next, distributions of the digital values along both the photosensor arrays 10, 11 which are shown in FIGS. 2(c), 2(d) are compared with each other through the electronic circuit, thereby distance x of the dislocation is converted to a value obtained on the sensors. The distribution of the digital values indicated by a solid line in FIG. 2(c) corresponds to the case where the distance d to the object 1 is infinite and hence the dislocation x is 0, from which it is understood that the measurement of the distance d may result in obtaining the number of the elements by which the distance x on the photosensor array shown in FIG. 2(d) is expressed.

Then in FIG. 1, the description refers to the case where an optical axis of a finder (not illustrated) for selecting the object 1 subjected to determination of the distance d thereto coincides with the optical axis of the small lens 2, namely the small lens 2 faces right to the object 1 as described hereinabove, however, optical axes of the finder and the small lens do not coincide generally with each other, needless to say. Assuming now the finder comes intermediately of the two small lenses 2, 3, the images 7, 8 on both the photosensor arrays 10, 11 will be dislocated right by distance $X_1$ and toward left by distance $X_2$ from the original position when the object 1 is infinitely located. But in this case, the distance d to the object 1 can also be measured by the same relational expression as described above by considering $x = x1 + x2$. Therefore the measurement of the distance d may also result in obtaining the dislocation x of images on both the sensor arrays, after all.

A circuit of the distance measuring equipment according to the prior art on the above principle is shown in FIG. 3. Two shift registers 12, 13 are shown in the drawing, and digital signals shown in FIGS. 2(c), 2(d), which are obtained by quantizing the output signals shown in FIGS. 2(a), 2(b) coming from the photosensor arrays 10, 11 shown in FIG. 1 are through an analog-digital converter (not shown), are stored in the shift registers corresponding to the sequence of the arrays of the photosensors. After the image signals are written in the shift registers 12 and 13 as above, a shift signal is applied to control terminals CTR of the shift registers 12 and 13 from a timing control unit 14, and the data of the image signals stored in the shift registers 12 and 13 are sequentially outputted from output terminals "out", being synchronized with each other stage by stage of the shift registers. The output of the shift registers 12 and 13 are returned to an input terminal "in" each and restored. An exclusive NOR circuit 15 makes "1" when the outputs from the shift registers 12 and 13 coincide and "0" when not coincident. A counter 16 counts the number of times when "1" is generated by the exclusive NOR circuit 15.

Now, assuming that the numbers of photosensors in the photosensor arrays 10, 11 shown in FIG. 1 are m and n pieces respectively, the even m and n pieces of image data are stored in the shift registers 12, 13 respectively, and m<n, then, when the data have been outputted m times from the beginning. All the data stored in the shift register 12 have been compared with the first m pieces of the data of the shift register 13. The counter 16 has counted how many bits are coincident as the result of the comparison therebetween under the state where they are not dislocated each other that is, the number of dislocations is 0. Further in such state, the contents stored in the shift register 12 have made a round to initialization, and the contents stored in the shift register 13 have circulated in dislocation m bits rightward. The contents of the counter 16 are then stored in a maximum coincidence storage circuit 17. Further, only the shift register 13 is shifted by (n−m+1) bits according to an indication from the timing control unit 14, and the counter 16 is cleared. The contents of the shift register 13 are taken dislocated 1 bit rightward from the initialized state according to the shift by (n−m+1) bits. A counter 18 is that of counting how many bits the contents stored in the shift register 13 are shifted rightward from the initialized state, which is stepped forward whenever the above-mentioned data comparison of the shift registers 12 and 13 are over. With the state wherein the contents stored in the shift register 13 have been shifted 1 bit rightward from the first initialized state as mentioned, the second comparison is carried out by shifting the data of the shift registers 12 and 13 m times rightward in sequence likewise. At the stage in which the second comparison has been over, the contents C1 of the counter 16 are compared for dimension with contents C2 of the maximum coincidence storage circuit 17 on a comparator 19, and if C1 is greater than or equal to C2, C1 is written in the maximum coincidence storage circuit 17. Then, contents S1 of the shift counter 18 are written in a dislocation number storage circuit 20 concurrently therewith. Only the shift register 13 is shifted by (n−m+1) bits rightward thereafter, and the counter 16 is cleared. From that time on, comparison of the stored contents between the shift registers 12 and 13, comparison of the contents between the counter 16 and the maximum coincidence storage circuit 17 and subsequent rewrite of the maximum storage circuit 17 and the dislocation number storage circuit 20, shift of the data of the shift registers 13 at (N−m+1) times, and clearance of the counter 16 are repeated at a predetermined number of times. At the time when the repeat has been over, the situation is such that a maximum incidence number as the result of having approved a coincidence of the contents of the shift register 12 with a part of the contents of the shift register 13 is stored in the maximum coincidence storage circuit 17, and a relative dislocation number between the shift registers 12 and 13, namely the dislocation rate x to obtain which is shown in FIG. 2(d) is stored in the dislocation number storage circuit 20. The timing control unit 14 latches contents of the dislocation number storage circuit 20 on an output latch 21 as a final step of the operation, thereby generating as a distance signal externally.

The distance measuring equipment constructed as above, which is full electronic and free from a moving part is found useful for its being miniaturized, cheap and high in distance measuring precision, however, there yet remain various problems when the equipment is actually operated. That is to say, a distance measuring result is erroneous, in most cases, where the object subjected to measurement of a distance thereto has a repetition of simple patterns such as stripes and checks. The cause is relevant to a principle on the detection of a coincidence of two images. In the case of such patterns, a dislocation number for making two images coincide may be allowed to exist plurally always. In such case, according to the conventional system shown in FIG. 3, the dislocation number whereby the count C2 of the maximum coincidence storage circuit 17 is maximized is merely obtained, therefore, if there exists plurally the dislocation number to make the two images coincide, the distance is capable of being measured from the dislocation number corresponding to a maximum coincidence point found by chance at first. Accordingly, the conventional measuring equipment may assume the distance based on the result corresponding to the farthest distance or the nearest distance of the plurality of dislocation numbers whereby the two images can be made to coincide to be a measured result, and thus forcusing a camera thereon, for example, may bring a blur on the image consequently. A similar problem occurs where the object to be subjected to a distance measurement is very dark. In such case, since an image output signal from the photosensor is low it is close to the threshold value Vt when the signal is quantized according to the method given in FIGS. 2(a), 2(b). Therefore, a pattern distribution of the quantized image data is too scanty to obtain the maximum coincidence sharply. The maximum coincidence point becomes obscure inevitably, or there may occur a case where the maximum coincidence point exists plurally as mentioned hereinbefore, and thus an error is easy to arise on the distance measurement.

One of the other problems refers to the case where the object to be subjected to distance measurement is dark in luminosity to take, for example, a minus EV value, and in this case since the quantity of light incident on the photosensor arrays 10, 11 of FIG. 1 is little, an output signal value from each photosensor in the arrays becomes low. Therefore, the signal does not reach or comes barely close to the threshold value Vt at the time of signal quantization shown in FIG. 2, and thus a result obtained through measuring the distance by means of such quantized digital signal value will not be reliable entirely. Of course, the matter can be settled by using an optical signal storage type sensor for the photosensor, however, since a considerably long time is required for storing the signal in this case, it can no more be applied to a video camera wherein it is not allowed to take considerably long time for measuring a distance because an image is recorded continuously while the field of video is moving. Accordingly, the image pickup as keeping the time for distance measurement at a minimum requirement may be effected according to an erroneously measured result on distance and also under an erroneous focusing condition, thus bringing a blur on the image.

In case, on the contrary, that the object has a satisfactory brightness, but there is scarcely observed a contrast of lightness in the object, the distance measurement becomes difficult in view of the abovementioned measuring principle, and where the contrast is totally not observed, the measurement will be no more practicable. The reason is that a quantization of output signal of the photosensor at any threshold value in this case is not to obtain a pattern of the digital signal value necessary for the distance measurement.

On the other hand, there may be a case where an error arises on the distance measured result despite a brightness of the object. The difference in brightness in the field of view of a camera is exceedingly big generally, and there are many cases where the luminosity of a bright zone reaches $10^6$ as high as that of a dark zone, therefore it is difficult to change the threshold value thus extensively at the time of quantization. Even though the object is exceedinly bright and has a contrast of brightness therein, it exceeds a threshold value for quantization almost all, and thus information on the contrast of brightness will not be obtainable at all or, if any, it is considerably limited. In any case, a digital output from the analog-digital converter becomes poor in pattern information of "0" and "1", and even if the subsequent digital circuit operates correctly, a result obtainable through measuring the distance will be that of lacking accuracy. It was tried to increase information content of the brightness pattern by multiplying the output of the analog-digital converter in bit instead of such 1-bit information, however, such means is not necessarily effective where the property of the object is not proper as mentioned.

Besides, where a plurality of objects different in distance happen to come in the field of view of the photosensor arrays, or the object has a regular pattern in brightness such as, for example, stripes or checks, the digital circuit outputs a distance measuring data through searching minutely a point whereat pattern information from both left and right photosensor arrays will be at a maximum coincidence, therefore a case where the distance measured result is present plurally may arise, and thus a determination on which measuring data to take as a correct result will not be obtainable.

SUMMARY OF THE INVENTION

In view of shortcomings unavoidable with the prior art, an object of this invention is to improve a distance measuring precision by generating information necessary for distance determination even where a luminous intensity distribution in the object to be subjected to distance measurement is improper for the measurement.

According to this invention, the above object can be attained by constituting the above-mentioned kind of distance measuring equipment such that when the shift rate whereat both image data rows indicate a high correlation exists plurally, the existence is detected accordingly thereon, and at least a part of the plural shift rate including a shift rate corresponding to the maximum correlation is stored and taken.

When two image data rows have distributions of fL(i) and fR(i) (i being photosensor number in each photosensor array) each, a correlation of the two image data rows can be expressed generally as:

$$F(xn) = \sum_i G\{fL(i), fR(i + xn)\}$$

where G is a function of fL(i), fR(i) and xn is a dislocation number. For distance measurement, the dislocation number xn taking a high value or a limit value particularly in the correlation function or appreciation function will be obtained, however, where the correlation is not simple, the dislocation number xn at the time of maximum correlation which is obtained merely in one as ever before is not satisfactory to cope with the situation, and the distance must be determined in consideration, if any, of other maximum value or limit value consequently. Therefore, in this invention, the circuit configuration will comprise detecting a high correlation value or particularly maximum correlation so observed for a plurality of shift rates, storing the plurality of shift rates to output as necessary information for the distance determination. Then, exclusive OR or exclusive NOR is utilized for digital circuit, in the majority of cases, as a form of above-mentioned appreciation function G, however, the gist of this invention will not necessarily be limited only to such form.

Another object of this invention is to provide a system whereby an erroneous measured result is prevented from being utilized and the most appropriate measured result can be selected, even in case the property of an object to be subjected to distance measurement is not suitable for distance measurement, and thus a satisfactory data is not obtainable or is ready, if any, in a plural piece.

Before attaining the above-mentioned object, various problematical points unavoidable with the prior art will be settled to a reasonable measure therefor in this invention. First, there may be a case where an optical property of the object to be measured is originally not suitable for distance measurement from its being exceedingly dark or contrastless, and the distance measurement can no more be practiced accordingly. Even in such case where the distance measurement cannot be effected, an optical instrument or other means to utilize a result on distance measurement must be acquainted at least to that effect. In this invention, an image signal row generated by a pair of photosensor arrays receiving an image of the object is utilized particularly for detection of such situation. The image signal row used for the detection can be either a signal itself generated by the photosensor or a guantized signal thereof. For detection of the situation that the measurement can no more be practiced from such signal row, it is more advantageous that a maximum image signal value and a minimum signal value in the signal row will be watched than taking a mean value of the signal row. When the maximum image signal value of both the signal rows does not reach a predetermined value necessary in one or both of the signal rows, the measurement can no more be practiced, therefore an incapability of the measurement can be detected from the maximum image signal, and reversely a possibility of deciding as incapable of measuring the distance despite being capable can be avoided thereby. If a difference between the maximum value and the minimum value of an image signal is obtained for one or both of the signal rows, then it can be detected that a contrast in luminous intensity of the object is too little to carry out the distance measurement. Further, such maximum value and minimum value can also be detected simply by means of an image signal value after being digitized, however, it is preferable that each signal be converted into a pulse having a pulse width corresponding to the luminous intensity thereof. A maximum value and a minimum value of such pulse width can be searched out through a simple OR gate or AND gate. Furthermore, it is advantageous that the pulse width be made decreasing or inversely proportional particularly in accordance as the image signal increases. Thus, even if there arises a fluctuation of several digits or so in a luminous intensity distribution of the image, such fluctuation can be confined within a relatively small pulse width range, and further a size of such pulse can be discriminated accurately within a short time through the above-mentioned logical gate. The first means in this invention as described above, that the distance measurement cannot be effected essentially and generates a first signal.

Next, the invention is provided with a second means whereby a stagger to make the two image signal rows coincide maximumly is detected to exist plurally and a second signal is generated accordingly. The second means detects the case where a plurality of results are obtained through measuring the distance because of an optical property of the object, while it cannot be detected by the first means, and thus the result is obscure. In this case, however, while the result is obscure, it does not mean straight that the result cannot be utilized. There may be a lot of cases where one of a plurality of measurements, for example the shortest distance, can be used according to the purpose, or the shortest distance of the results, for example, can be selected according to the purpose. In this invention, the second signal indicating that the measured result exists plurally is therefore generated separately from the above-mentioned first signal. Since either an optical instrument or an operator using the distance measured result can be acquainted with a plurality of measured results according to the second signal, the result serving a purpose most definitely can be selected from among the plurality of measured results according to the second signal and so utilized. It is advantageous that a shift register will be utilized for detecting a presence of the plural measured results. A coincidence factor between two image signal rows is inspected for various staggers, therefore a shift register having the same number of stages as the stagger used for inspection of the coincidence factor is provided, and a logical value or "1", for example, which indicates that a maximum coincidence has been obtained can be stored at the stage the number of which corresponds to the stagger whereat the maximum coincidence is obtained. A presence of the maximum coincidence in plural stages can be detected by sending a read pulse to the shift register and counting a number of the above-mentioned logical values obtained sequentially from an end of the shift register. In this case, further, it is preferable that a detection be made on whether the plural maximum coincidence or a plural measured result is present continuously for the consecutive stagger or is present discontinuously for the isolated stagger. The optical instrument or the user can select and so utilize the result complying with the purpose most definitely from among the plurality of measured results according to the signal indicating a presence of the plurality of measured results and the signal indicating a continuous distribution or discontinuous distribution.

As described, the second signal indicating a presence of the plural measured result is generated separately from the first signal indicating that the measurement cannot be effected essentially, and thus an opportunity on which the masured result is utilized can be increased even in case an opportunity for the distance measurement should be lost only by one kind of signal.

Other objects and features of the invention will be clarified according to the following description of the accompanying drawings.

BRIEF DESCRIPTION OF THE DRAWINGS

FIG. 1 and FIG. 2(a) to FIG. 2(d) represent a measuring principle of a distance measuring equipment according to this invention, wherein FIG. 1 is an explanatory drawing of a distance measuring principle based on a triangular surveying using a pair of photosensor array, and FIG. 2(a) to FIG. 2(d) are explanatory drawing of a method wherein an image signal from the photosensor arrays is quantized and converted into an image data.

FIG. 4 to FIG. 14 represent embodiments of the equipment according to this invention, wherein FIG. 4 is a block circuit diagram representing an overall circuit of the distance measuring equipment according to this invention;

FIG. 5 is a circuit diagram of the equipment of this invention around an appreciation function generating circuit showing a correlation between image rows;

FIG. 6 is a circuit diagram showing a detail of the appreciation function generating circuit in FIG. 5;

FIG. 7 is a circuit diagram of a part storing and sending a shift number signal where the shift number whereat image data rows show a high correlation exists in a plural piece;

FIG. 8 is a circuit diagram for generating a first signal DA immediately after closing of a power supply as a first means in another embodiment of this invention;

FIG. 9 is a waveform diagram for describing an operation of the circuit given in FIG. 8;

FIG. 10 is a circuit diagram representing an illustrative example of one photosensor (one of photosensors $10_1L$ to $10_mL$, $10_1R$ to $10_nR$ shown in FIG. 12) of the photosensor arrays as a part of the first means;

FIG. 11 is a waveform diagram for describing an operation of the circuit shown in FIG. 10;

FIG. 12 is a circuit diagram of a concrete circuit for detecting a condition wherein a distance measurement cannot be effected essentially due to the image of an object as the first means;

FIG. 13 is a circuit diagram representing an illustrative example generating first signals DB, DC and DD upon receipt of a detection signal from the circuit of FIG. 12;

FIG. 14 is a circuit diagram representing an illustrative example detecting a presence of a distance measured result in a plural piece and generating second signals DE, DF and DG as the second means.

DESCRIPTION OF THE PREFERRED EMBODIMENTS

Figure 3:
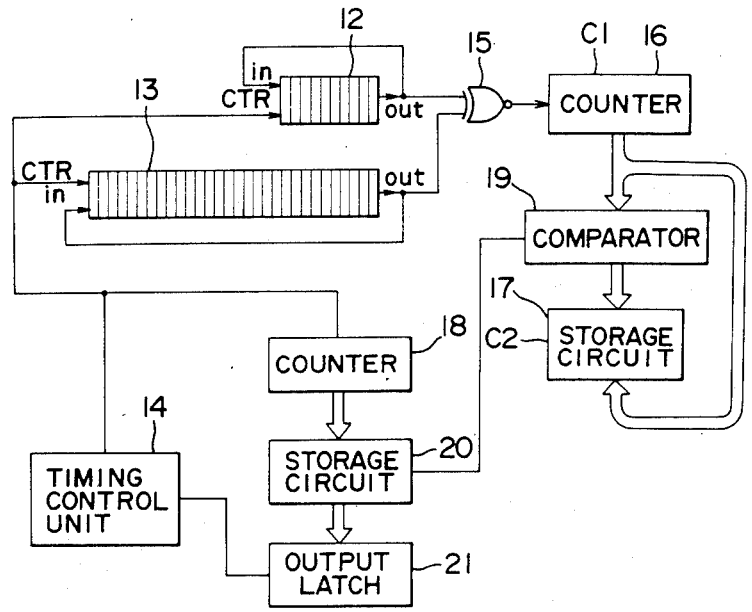
FIG. 3 is a block circuit diagram representing a circuit of the distance measuring equipment according to the prior art.
Figure 4:
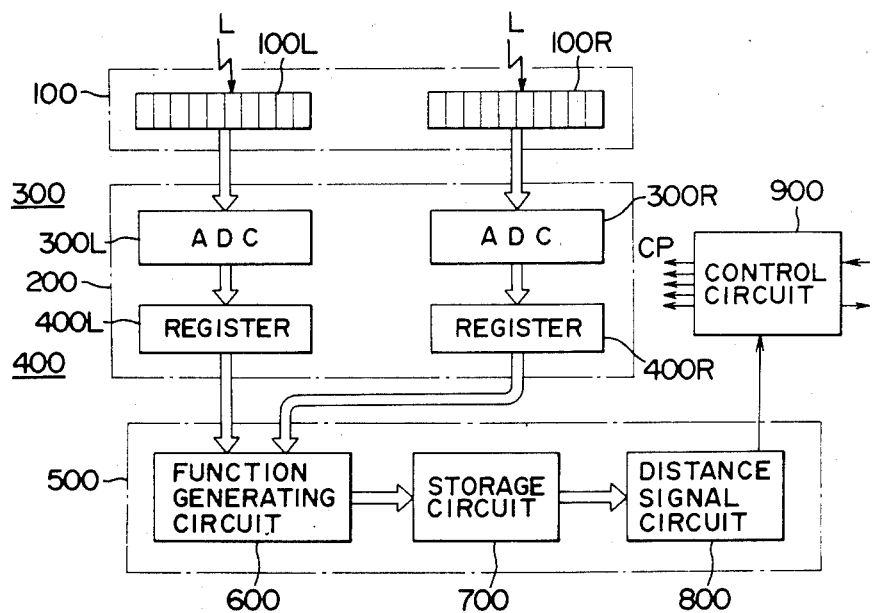

The invention will now be described in its preferred embodiments with reference to the accompanying drawings. In FIG. 4, a photosensor array part 100 indicated by a one-dot chain line comprises a left photosensor array 100L and a right photosensor array 100R, which receive a light L of the image formed through a distance measuring small lens or photographing lens and then send a photoelectric output signal to a left analog-digital converter (hereinafter called ADC) 300L and a right ADC 300R in a quantizing circuit 200 respectively as indicated by arrows in FIG. 4. In the signal transfer, there may be a case where an output signal of each photosensor element is sent to ADC in series or in parallel, however, the latter will be preferable, needless to say, for shortening the time for measurement. An analog signal from each photosensor element is converted into a digital value in one bit or desired bit number through ADC's 300L, 300R and then sent to appurtenant registers 400L, 400R to storage therein. A shift register, for example, may serve as the above registers, and such shift register has the same stage number as the photosensor arrays 100L, 100R and has the quantized digital value stored therein in the same sequence as luminous intensity distribution in the image coming into photosensor arrays. In case an output of the above-mentioned ADC is multiple in bit number, the shift register is constituted of having, for example, a binary shift register provided in parallel by the number of bits of the signal. An image data is stored in both the shift registers 400L, 400R in the state wherein a distribution of the digital value is shifted by the number of stages of the shift register corresponding to a stagger x between left and right images received on the photosensor arrays 100L, 100R.

For obtaining a shift rate xn indicating a high correlation from the two image data stored in both the shift registers 400L, 400R with the distribution thus shifted, an appreciation function generating circuit group 600 described hereinafter is provided. An appreciated result according to the appreciation function generating circuit is sent to an appreciated result storage circuit 700, especially, if there is the appreciated result indicating a high correlation present in a plural stages as described hereinafter, then all the results are stored in the storage circuit 700. A distance signal circuit 800 receives a content in the appreciated result storage circuit 700, and if the appreciated result is single, it decides the shift number xn to make the two image data coincide with each other according thereto, which will be taken as a distance signal or multiplied, as occasion demands, by a constant or the like to calculate the distance d. The distance signal circuit 800 can be constituted as a simple counter if it is only to send the shift number xn as a discharge signal, however, in this invention it also handles the case where a plurality of shift number indicating a high correlation is present, therefore a circuit handling a plural shift number as described hereinafter is included therein. A central control circuit 900 reads out information on the above-mentioned distance signal and the plural shift number from the distance signal circuit 800 according to an external calling and sends it externally, furthermore, it functions also as a timing control circuit for giving a clock pulse and a control pulse to each circuit part. As will be easily understood, the function of a part or appreciable part of such overall circuit can be assigned to a microcomputer, and the overall circuit including the photosensor array part can be integrated in one semiconductor chip according to how it is intended. That is to say, a distance detection circuit 500 is provided for searching out a shift stage number of the digital value distribution in the shift register corresponding to the above-mentioned stagger x. At first digital values loaded in both the left and right registers 400L, 400R are sent to a comparison circuit 600, checked for coincidence at each stage of the shift registers, and then the number of times whereat both values have coincided is stored by the compared result storage circuit 700. Where there is a shift in distribution of the digital values stored in both registers, a value of the number of times for coincidence which is stored in the compared result storage circuit 700 is small naturally. After a digital storage value in one of the registers 400L, 400R is shifted to the other by one stage according to a control pulse CP from the central control circuit 900, the digital values in both the registers are checked for coincidence at each stage through the comparison circuit 600 likewise, and when the number of times for coincidence is greater than the previous one stored in the compared result storage circuit 700, the number of times for coincidence which is stored in the compared result storage circuit 700 is rewritten to a new one, one pulse is sent to the counter in the distance signal computation circuit 800 and the counter has the storage value reset to 0 added with 1 at first. Then, the digital values in both the registers 400L, 400R are shifted mutually by one stage and so compared according to the control pulse CP from the central control circuit 900 likewise thereafter, and where the new number of times for coincidence is less than that in the compared result storage circuit 700, the storage value of the number of times for coincidence is not updated, and nothing is added to the counter in the distance signal computation circuit 800. After the comparison has been made as mentioned by a predetermined number of times, the count value remaining in the counter in the distance signal computation circuit may indicate the shift stage number necessary for making a distribution of the digital values loaded at first in both the registers coincide most definitely, and thus the photosensor number xn corresponding to the stagger x can be obtained.

In the distance signal computation circuit 800, the stagger x or the distance d to be obtained finally are computed on a predetermined expression according to such photosensor converted shift number xn. This distance signal is sent according to a distance signal read pulse from the central control circuit 900, and the central control circuit 900 sends the distance signal externally according to a call from an external unit.

Figure 5:
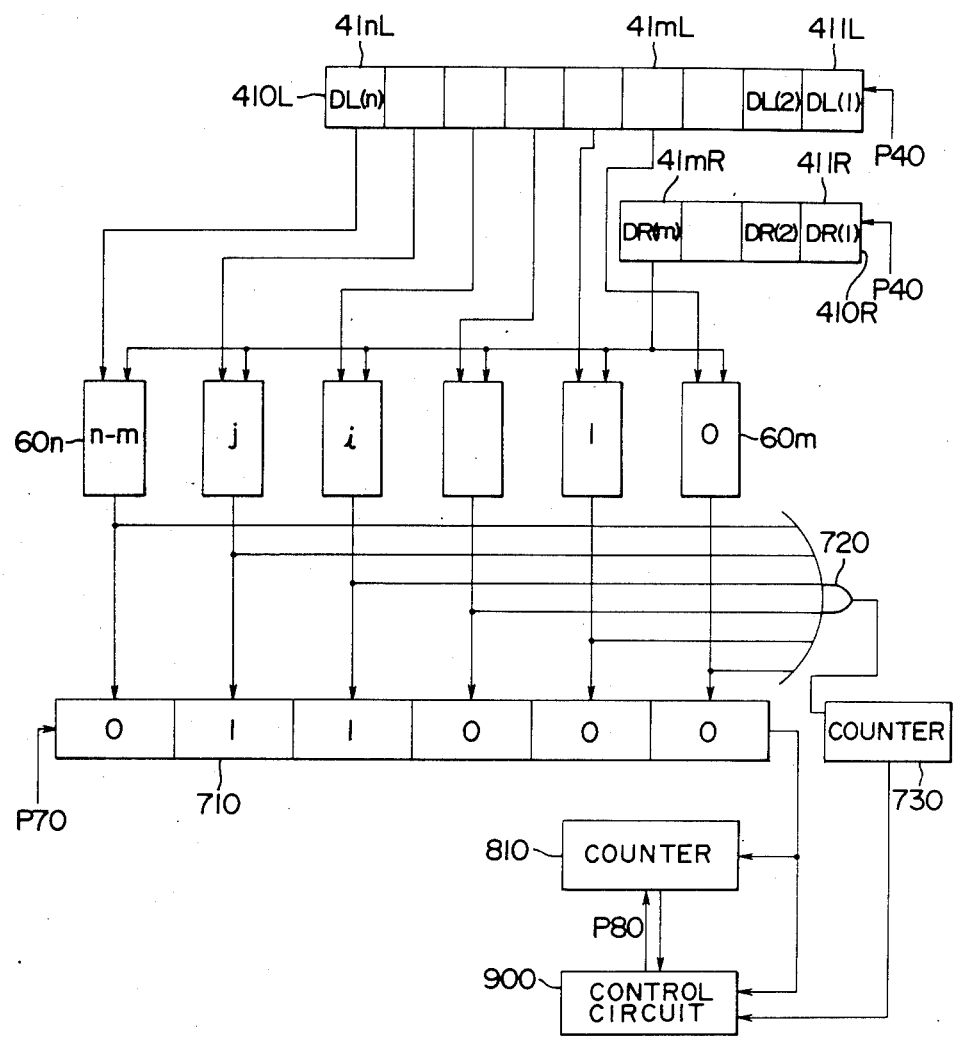

FIG. 5 represents a circuit of an embodiment of this invention. As illustrated, shift registers 410L, 410R comprise n pieces of stages 411L to 41nL and m pieces of stages 411R to 41mR respectively to cope with the photosensor arrays 11, 10 described in FIG. 1, forming a pair of shift registers different in the number of stages (n>m). Quantized image data are sent in parallel or series as described above to the shift registers 410L, 410R from ADC's 300L, 300R shown in FIG. 4, which are so stored therein in the same sequence as array of the photosensors in the photosensor arrays 100L, 100R. FIG. 5 then indicates the case where the image data comes in one bit for simplicity of the description, however, in case the image data is multiple in bits, binary registers, for example, will be provided in parallel according to the bit number constituting each image data. A shift pulse P40 is given synchronously to both the shift registers 410L, 410R from the central control circuit 900, and the image data stored in the shift registers are shifted successively thereby from right to left in the drawing. As illustrated, the one shift register 410L is constituted for ready generating in parallel from stages 41mL to 41nL, and the other shift register 410R is constituted as a serial outputting shift register capable of generating only from the stage 41mR on the left end.

Figure 6:
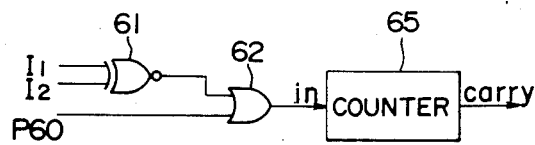

There are provided, under both the shift registers, n−m+1 pieces of appreciation function generating circuits 60m to 60n, which then form the appreciation function generating circuit group 600 described in FIG. 4. Each of the appreciation function generating circuits 60m to 60n is constituted of an exclusive NOR gate 61 and OR gate 62 and a counter 65, as shown in FIG. 6, in this embodiment. An image data output is applied in common to one of two inputs $I_1$, $I_2$ of the exclusive NOR gate of each of the appreciation function generating circuits 60m to 60n, as shown in FIG. 5, from the final stage 41mR of the shift register 410R. Now, in the first state before the shift pulse P40 is given, image data DL(1) to DL(n) are stored in each stage of the shift register 410L, and image data DR(1) to DR(m) are stored in each stage of the shift register 410R respectively. Therefore, when the first shift pulse P40 is given, the m-th image data DL(m) of the shift register 410L is given to one of the inputs of the exclusive NOR gate 61 of the appreciation function generating circuit 60m, and also the m-th image data DR(m) of the shift register 410R is given to the other input. When the next shift pulse P40 is given, the image data in both the shift registers 410L, 410R are sent one stage leftward in the drawing, therefore the image data DL(m−1) is sent to the appreciation function generating circuit 60m from the stage 41mL of the shift register 410L, and the image data DR(m−1) is sent thereto from the stage 41mR of the shift register 410R. The exclusive NOR gate 61 of the appreciation function generating circuit 60m checks the two input signals for coincidence whenever these signals are received, generates output only when both the input signals coincide, and then opens the OR gate to counting of the number of times for coincidence on a counter 65. Such operation is continued as long as the image data DL(1), DR(1) on the first stages of the shift registers 410L, 410R are obtained from the m-th stages 41mL, 41mR on the shift pulse P40 given repeatedly.

Now, as will be apparent from the above description, the appreciation function generating circuit 60m adds results obtained through comparing image data stored at first in the same numbered stages of both the shift registers 410L, 410R at all times, and hence the appreciation function generating circuit 60m compares the image data of both the shift registers 410L, 410R under the state where they are not shifted mutually, or the shift number is zero, and then generates an appreciation function. The above is illustrated by 0 in the frame indicating the appreciation function generating circuit 60m. On the other hand, when the appreciation function generating circuit 60n laid out on the left end is taken up, the image data DL(n) on the final stage 41nL of the shift register 410L and the image data DR(m) on the stage 41mL of the shift register 410R are compared, as illustrated, under the state where the first shift pulse P40 is given, which may be translated that the image data n−m pieces shifted mutually are compared, and since the shift number n−m will not be changed when the ensuing shift pulse P40 is given, the appreciation function generating circuit 60n may be taken to generate the appreciation function as comparing the two image data under the state where the shift number is (n−m), after all. It can easily be understood that the appreciation function generating circuits coming between both the appreciation function generating circuits 60m, 60n compare two image data rows under the state where the shift number is 2, 3, ∼n−m−1. As described above, the appreciation function generating circuit group 600 compares two image data rows concurrently for the shift number 0∼n−m, generates an appreciation function for each shift number, which will be stored in each counter 65. It is a feature of this invention that the appreciation function is generated and so stored for each mutual shift number between data rows to take a correlation between two image data rows. Further, the simplest example wherein the number of times for coincidence of individual data of two image data rows is obtained as an appreciation function has been taken up for the above description, however, the appreciation function is not limited thereto, needless to say, an arbitrary technique known hitherto for obtaining a correlation between two image data rows can be employed otherwise, and it is apparent that the appreciation function generating circuits 60m to 60n, or the logical function division particularly can be constituted properly according to such technique.

As described, an appreciation function according to the result obtained through comparing with the two image data rows shifted mutually for 0∼n−m stages is stored in each counter 65 of n−m+1 pieces of appreciation function circuits 60m to 60n, therefore that of high correlation between the two image data rows must be searched out of the appreciation functions. In this embodiment, accordingly, a read pulse P60 is given simultaneously to the above-mentioned OR gate 62 in each of the appreciation function generating circuits 60m to 60n. The OR gate 62 is opened whenever the read pulse P60 is given once, and "1" is added simultaneously to the counter 65. From giving the read pulse repeatedly, the counter storing maximum number of times for coincidence, or the counter 65 corresponding to a shift number i gives rise to overflow and generates a carry signal "1", for example. A shift register 710 shown downward in FIG. 5 is that of constituting the compared result storage circuit 700 described in FIG. 4, having n−m+1 pieces of stages corresponding to each of the appreciation function generating circuits 60m to 60n. Further, the shift register 710 is constituted to be ready for setting in parallel in each stage and stores a stage "1" corresponding to the shift number i as illustrated upon receipt of the carry signal "1" from the appreciation function generating circuit corresponding to the shift number i. Then, an illustrated OR gate 720 is provided in the compared result storage circuit 700 and applies the carry signal from the coincidence detecting circuits 60m to 60n in parallel, therefore it opens the gate immediately even on one carry signal to give notice to the central control circuit 900 thereof, the central control circuit 900 then stops sending the read pulse P60 to each counter 65, therefore the counter 65 stops going any further, and thus other carry signals will not be generated. Or as illustrated in FIG. 5, a counter 730 is interposed between the OR gate 720 and the central control circuit 900, and thus a signal indicating stoppage of the read pulse P60 when the carry signal has been obtained at a predetermined number of times, or two times for example, will be given from the counter 730 to the central control circuit 900. There may be a case, however, the first carry signal is given concurrently not only from the counter 65 corresponding to the shift number i but also from that of corresponding to another shift number j, and in such a case, "1" is also stored in the stage corresponding to the shift number j of the shift register 710, as illustrated. Or, in case the first carry signal was not given from the counter 65 corresponding to the shift number j, but the second carry signal has been given therefrom, "1" is stored likewise in the stage of the shift register 710 corresponding to the shift number j, when the counter 730 is set to 2. Where the counter 730 is provided, then an arrangement is such that the shift register 710 will be provided in a plural piece, whereby storing, for example, the first carry signal in the first shift register and the second carry signal in the second shift register.

As described above, even in case there exist a plurality of shift numbers indicating a high correlation between two image data rows, a predetermined logical value is stored in each stage of the shift register 710 corresponding to the plural shift number.

A counter 810 of FIG. 5 is so provided as to cope with a normal state wherein a shift number indicating a high correlation is present in one only. If the shift number is i, then such shift number i as having made two image data rows coincide at the highest correlation or maximumly is read by giving a read pulse P70 to the shift register 710 from the central control circuit 900. The distance signal computation circuit 800 is constituted as the simplest counter 810 for illustration in this embodiment, and from the point in time when the read pulse P70 is given to the shift register 710 from the central control circuit 900, a count pulse P80 synchronized therewith is given repeatedly. Accordingly, a count value of the counter 810 steps further by 1 synchronously with a data in the shift register 710 being shifted by one stage rightward in the drawing by the read pulse P70. However, as soon as the logical value "1" storing the shift number indicating the highest correlation is obtained from the shift register 710, the central control circuit 900 detects it and stops the count pulse P80 immediately, therefore a count is stopped and the shift number i is stored in the counter 810 as a count value. The central control circuit 900 then reads the count value out of the counter 810 and takes it externally thereafter.

Figure 7:
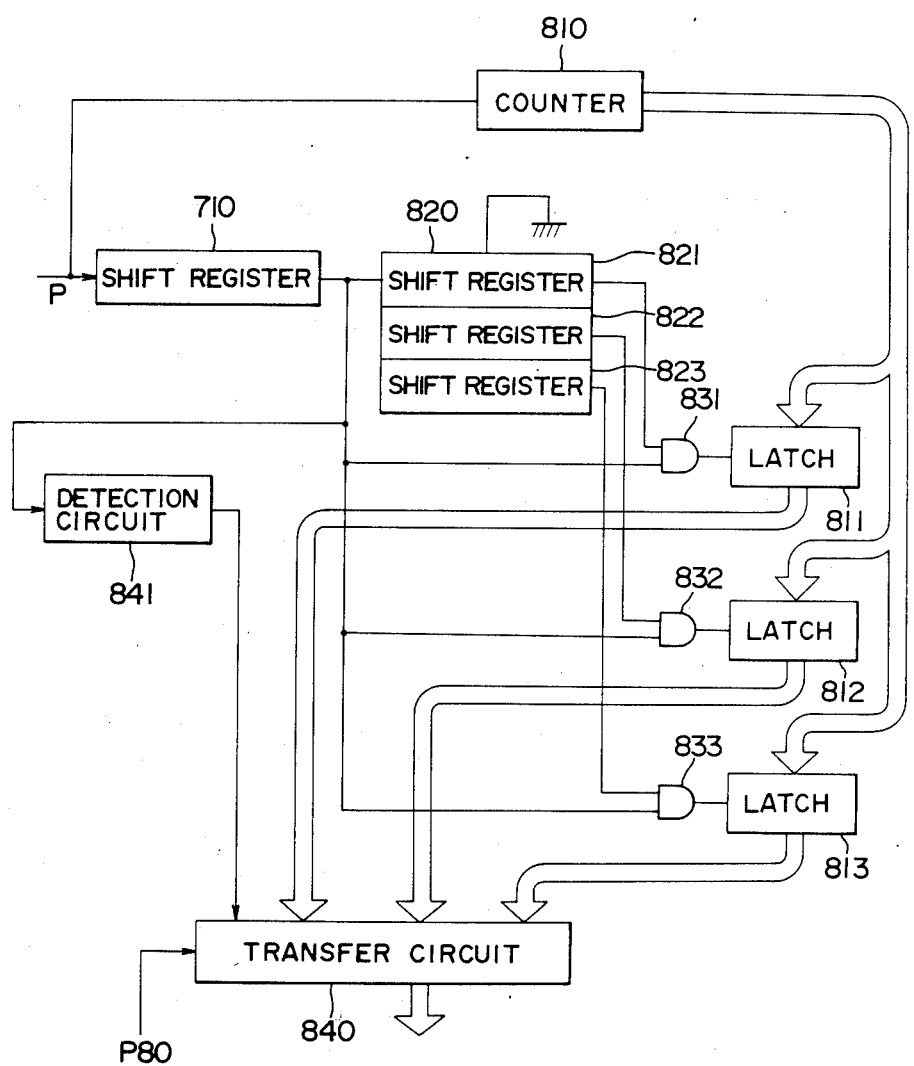

FIG. 7 represents a circuit for detecting an existence of a plurality of shift numbers indicating a high correlation between two image data rows and sending it as a useful information data for distance measurement. In such a case, a logical value indicating the high correlation is stored in the plural stage of the shift register 710, as described above. The counter 810 of FIG. 7 corresponds to that of FIG. 5, which counts a repeat pulse number of the read shift pulse P70 to the shift register 710, and the count value is applied to latches 811, 812, 813. Such a data read to the latches 811, 812, 813 is controlled by AND gates 831, 832, 833 respectively. That is to say, the latches read input data when outputs of the AND gates 831, 832, 833 come in "1", and then hold the data to obtaining. A serial output from the shift register 710 is connected to a shift clock input of a shift register 820. Prior to start in operation, the shift register 820 has been set by a timing control unit in the central control circuit 900 and thus initialized internally to "1" and the input has been grounded to the so-called "0" input, therefore, whenever "1" is obtained from the shift register 710, the shift register 820 is shifted by one bit toward "0" internally and finally to "0" all. The output of a first stage 821 of the shift register 820 changes from "1" to "0" on the first "1" output from the shift register 710, the output of a second stage 822 changes from "1" to "0" on the second "1" output from the shift register 710, and the output of a third stage 823 changes from "1" to "0" on the third "1" output of the shift register 710. Outputs from the stages 821, 822, 823 of the shift register 820 are applied to the AND gates 831, 832, 833 respectively, an output of the shift register 710 is applied in common to the AND gates 831, 832, 833, therefore an output of the AND gate 831 becomes "1" only at the time of the first "1" output of the shift register 710, an output of the AND gate 832 becomes "1" at the time of the first and second "1" outputs from the shift register 710, and an output of the AND gate 833 becomes "1" at the time of the first, second and third "1" outputs from the shift register 710. That is to say, when a serial output of the shift register 710 becomes "1" first at the i-th bit, i is counted on the counter 810, and the count output i is stored in the latches 811, 812, 813, as outputs of the AND gates 831, 832, 833 are all "1". Then, when the serial output of the shift register 710 is given in the second "1" output at the j-th (j>i) bit from the first, j is counted on the counter 810, and the count output j is stored in the latches 812, 813, as outputs of the AND gates 832 and 833 are "1". Further, when the serial output of the shift register 710 is given thereafter in the third "1" output at the k-th (k>j>i) bit from the first, k is counted on the counter 810, and the count output k is stored in the latch 813, as an output of the AND gate 833 is "1". Then, outputs of the AND gates 831, 832, 833 are all "0" thereafter irrespective of the output of the shift register 710 being "1", therefore data held on the latches 811, 812, 813 are not changed.

In conclusion, where only one of the carry signals from the appreciation function generating circuits 60m to 60n shown in FIG. 5 becomes "1", the shift number i corresponding to the appreciation function generating circuit having generated the above only one carry signal is stored in the three latches 811, 812, 813 all; where the carry signal is generated from the appreciation function generating circuit corresponding to the two shift numbers i, j (j×i), the shift number i is stored in the latch 811, and the shift number j is stored in the latch 812; wherein the carry signal is generated from the appreciation function generating circuit which corresponds to three pieces or over of the shift numbers i, j, k (k>j>i) and the like similarly, the shift number i is stored in the latch 811, the shift number j is stored in the latch 812, the shift number k is stored in the latch 813 and so on.

After the shift numbers are thus written in the latches 811, 812, 813, an output data transfer circuit 840 will be controlled to read output data from the latches 811, 812, 813 in sequence or in parallel according to the read pulse P80 from the central control circuit 900. In case a data converted into the distance d to obtain is necessary as a distance signal instead of such shift number as the output data, the shift number is multiplied by a constant or the distance d is calculated according to a predetermined expression, and thus the distance signal is sent through the output data transfer circuit 840. Then, a plural signal detection circuit 841 is provided as shown in FIG. 7, which is available for detecting a presence of the shift number indicating a high correlation between two image data rows and sending a signal to that effect, and if a counter is provided in the plural signal detection circuit 841, then the presence of such plural piece of shift numbers can be sent as a data thereon. Further, the latch to store the shift number is arranged in three pieces in the embodiment shown in FIG. 7, however, the invention is not necessarily limited thereto, and the latch can be increased in number properly with each. Furthermore, in case the shift register 710 is multiplexed to store discriminatingly the shift number indicating the highest correlation and the other shift number indicating a high correlation next thereto, the shift numbers can be stored and sent accordingly with a correlation degree discriminated separately by reduplicating all or a part of the circuit shown in FIG. 7, which can simply be put into practice within the gist of this invention.

As described above, in the equipment of this invention, a presence of a plurality of shift rates, if any, indicating a high correlation between two image data rows to be compared with each other as shifted for distance measurement is so detected, and at least a part of the plurality of shift rates including that of indicating the highest correlation is stored and obtain. Therefore a problem that an error arises unavoidably because the distance is obtained by calculating merely based on a single shift rate is removed. Furthemore, even though luminous distribution of an object to be subjected to a distance measurement is too simple or the brightness of the object is too law to satisfactorily effect the distance measurement, since a data which is necessary to determine the distance can be obtained as information, the improvement in precision of the distance measuring equipment and also for enlargement of the scope of application can be expected. Where the shift rates indicating a high correlation are present continuously, for example like 3, 4, which are so detected according to this invention, the smaller 3 or the larger 4 reversely can be taken as a distance signal according to a purpose of the distance measurement. Then, where there exist two shift rates indicating a high correlation discontinuously, for example as 3, 5, the intermediate 4 can be employed as a distance signal. Further, where the shift numbers having indicated the highest correlation are discontinuous, for example like 3, 6, and those of indicating a high correlation next thereto are 5, 7, then, the shift number 3 will be abandoned as an erroneous signal and the shift number 6 can be employed. Be that as it may, an algorithm for selecting or calculating the shift number complying with a purpose from such a plural shift number signal is determined on a purpose of the distance measurement and characteristics of the equipment using a measured result, and hence it is arranged as a software in a microcomputer incorporated in an optical instrument such as, for example, camera or the like, thereby improving a precision of the distance measurement.

Figure 10:
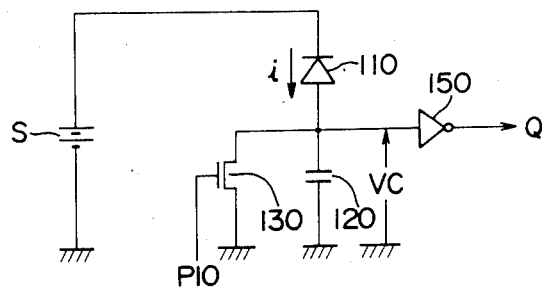
Figure 11:
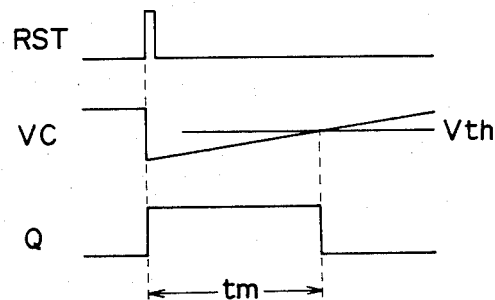

Then, in a circuit for calculating the distance signal described as above, there may be a case where the distance signal becomes indefinite for various causes. Another embodiment of this invention will be described in detail by primary factors for the distance signal to be indefinite. In the following embodiment, a first means is shown in FIG. 10 to FIG. 12, a second means is shown in FIG. 13, and DA, DB, DC and DD of the signals given by the first and second means indicate first signals, and DE, DF and DG indicate second signals.

Figure 8:
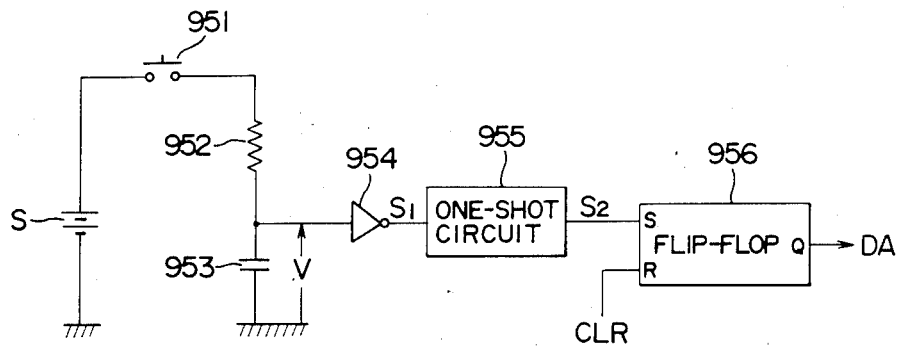
Figure 9:
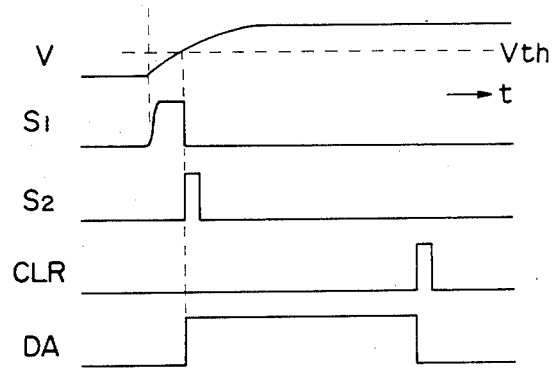

FIG. 8 represents a circuit for detecting an indefiniteness of the distance signal arising immediately after a supply to the distance measuring equipment of this invention is turned on, wherein voltage of a supply S is applied on an integration circuit constituted of a resistance 952 and a capacitor 953 when a power switch 951 is turned on, and a potential V on a junction of the resistance 952 and the capacitor 953 rises as indicated by V of FIG. 9. The potential V is applied to an inverter 954 used as a threshold element, and an output $S_1$ of the inverter 954 keeps "0" after the potential V becomes greater than a threshold value Vth of the inverter 954 as shown in FIG. 9. Further, the signal $S_1$ is applied to a one-shot circuit 955 by a fall of the output, therefore an output $S_2$ of the one-shot circuit 955 stands as shown in FIG. 9. The output $S_2$ is further applied to a set terminal S of a flip-flop 956, therefore the output DA of the flip-flop 956 becomes "1" whenever an output potential V of the integration circuit reaches the threshold voltage Vth of the inverter 954. The above-mentioned distance measuring circuit is actuated by the signal $S_2$ to commence a measuring operation, and when the measuring operation is over, a CLR signal waveform of which is shown in FIG. 9 is sent to a reset terminal R of the flip-flop 956 from the circuit 900, and the output DA of the flip-flop 956 becomes "0". The output DA of the flip-flop 956 being "1" may indicate that a measured result is not trustworthy, while the distance measuring circuit operates normally for measurement.

Next, an embodiment of this invention will be described with reference to the case where a distance cannot be measured practically due to the optical conditions of an object. FIG. 10 represents a concrete circuit of the embodiment of a portion corresponding to one photosensor in the photosensor array 100 of FIG. 4 and one conversion element in ADC 300, wherein the photosensor is shown as a photodiode 110. In the drawing, the photodiode 110 converts the intensity of an incident light L into that of a photocurrent i. The photocurrent i charges a capacitor 120, and an output voltage VC of the capacitor 120 rises in the inclination according to a dimension of the photocurrent i as shown in FIG. 11. The capacitor voltage VC is applied to an inverter 150 used as a threshold element, and an output Q of the inverter 150 becomes "1" when a reset pulse P10, the waveform of which is shown in FIG. 11, is sent to a discharge transistor 130 from the circuit 900 and it becomes "0" when the capacitor voltage VC reaches the threshold value Vth of the inverter 150. A pulse width tm of the output Q of the inverter 150 becomes a signal indicating the luminous intensity L (tm being almost inverse to L). In other words, a photosensor circuit shown in FIG. 10 receives the reset pulse P10 to commence a measurement of the luminous intensity and generates the pulse Q with the width tm indicating the luminous intensity. Needless to say, an output from such photosensor is applied to a signal converter 300 shown in FIG. 4 and converter into a digital value as image data.

Figure 12:
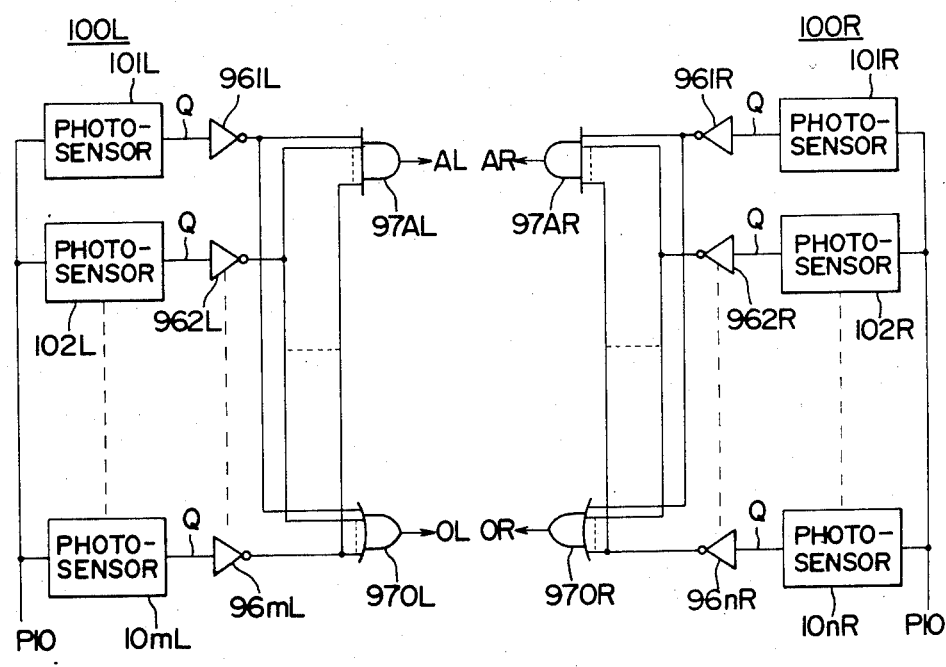
Figure 13:
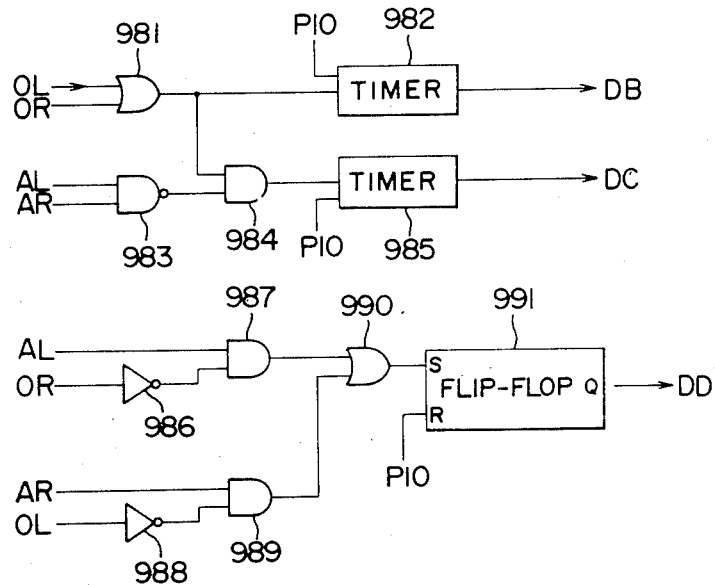

Now, FIG. 12 and FIG. 13 represent a circuit for detecting a discrepant condition of the output Q of the photosensor, and there shown in FIG. 12 are m pieces of photosensors 101L to 10mL constituting the left photosensor array 100L, and likewise n pieces of photosensors 101R to 10nR constituting the right photosensor array 100R. These photosensors receive the above-mentioned reset pulse P10 to commence a measurement of the luminous intensity all together and output the pulse Q having a width indicating the luminous intensity each. These pulse outputs Q are applied to the left group of inverting 961L to 96mL and the right group of inverters 961R to 96nR each. Further, outputs of the left inverters 961L to 96mL are applied to the left AND gate 97AL and the left OR gate 970L in parallel, and likewise outputs of the right inverters 961R to 96nR are applied to the right AND gate 97AR and the right OR gate 970R in parallel. As will be easily understood, an output AL of the left AND gate 97AL becomes an inverted waveform of that with the longest pulse width of the output pulses Q from the left group of photosensors 101L to 10mL, and an output OL of the left OR gate 970L becomes an inverted waveform of that with the shortest pulse width. Similarly, an output AR of the right AND gate 97AR is an inverted waveform of that with the longest pulse width of the output pulses Q from the right group of photosensors 101R to 10nR, and an output of the right OR gate 970R is an inverted waveform of that with the shortest pulse width.

These AND gate outputs AL, AR and OR gate outputs OL, OR are applied to a circuit of FIG. 13 as illustrated. In the circuit of FIG. 13, the signals OL and OR are applied to a timer 982 for OR operation by an OR gate 981. It will be easily understood from the above description that the time from the photosensor arrays 100L, 100R being actuated on the reset pulse P10 to an output of the OR gate 981 coming to "1" will be the same as a response time in the photosensors 101L to 10mL, 101R to 10nR, or that of the shortest one of the time tm before the output Q is given. From getting the timer 982 ready for starting the operation on the above-mentioned reset pulse P10 and stopping it on the output of the OR gate 981, the timer 982 will output DB when the shortest pulse width tm becomes a predetermined value or over. Now, since the pulse width tm is almost inverse to the luminous intensity in the photosensor circuit of FIG. 10, the output DB from such timer 982 may suggest that even the strongest one of luminous intensities received on the photosensors 101L to 10mL, 101R to 10nR is weaker than a predetermined luminous intensity. On the other hand, the signals AL, AR are applied to a NAND gate 983. Similarly, the time in which an output of the NAND gate 983 is "1" becomes the same as that of the longest response time of the outputs Q from the photosensors 101L to 10mL, 101R to 10nR. Further, the output of the NAND gate 983 and the output of the above-mentioned OR gate 981 are subjected to AND operation by an AND gate 984, therefore the time in which an output of the AND gate 984 is "1" is equalized to a difference between those with the longest and shortest response times of the outputs Q from the photosensors 101L to 10mL, 101R to 10nR. In this embodiment, a duration of the output of the AND gate 984 is regarded as representing a contrast of the object image, the output of the AND gate 984 is applied to a timer 985 actuated on the above-mentioned reset pulse P10 to discontinue its operation, and when the duration of the output of the AND gate 984 is a predetermined value or below, or the operation for distance measurement is difficult for a contrast of the object image coming below a predetermined value, the output signal DC is given from the timer 985.

A circuit shown downward in FIG. 13 is that for detecting the case where there is an extreme difference between luminous intensities of two objects coming in a field of view of the photosensor arrays. As illustrated, the signal OR is inverted on an inverter 986 and subjected to AND operation with the signal AL by an AND gate 987. The signal AL becomes "0" on the reset pulse P10 and is reset only when those with the longest response time of the left photosensors 101L to 10mL, namely all the left photosensors respond, and an inversion signal of the signal OR becomes "1" on the reset pulse P10 and is reset to "0" when that with the shortest response time of the right photosensors 101R to 10nR, namely any one of the right photosensors responds, therefore a generation of an output signal from the AND gate 987 may suggest that any one of the right photosensors 101R to 10nR does not respond, while the left photosensors 101L to 10mL have all responded. That is to say, the output of the AND gate 987 may suggest that the luminous intensity of an object image received on the left photosensor array 100L is extremely stronger than the luminous intensity received on the right photosensor array 100R, and thus a distance measurement cannot be effected practically. Similarly, a generation of an output from an AND gate 989 subjecting the signal AR and an inversion signal of the signal OL through an inverter 988 to AND operation may suggest that the luminous intensity received on the right photosensor array 100R is extremely stronger than the luminuous intensity received on the left photosensor array 100L, and thus a distance measurement cannot be effected practically. Then, an OR gate 990 is opened on an output of the AND gate 987 or 989, and a flip-flop 991 reset on the reset pulse P10 is then set to output the signal DD. An output of such signal DD is serviceable for detection of the case where one optical system of the photosensor arrays is severely polluted or erroneously covered other than the case where there is an extreme difference between luminous intensities of the two objects in the field of view of the photosensor arrays as described hereinabove.

Figure 14:
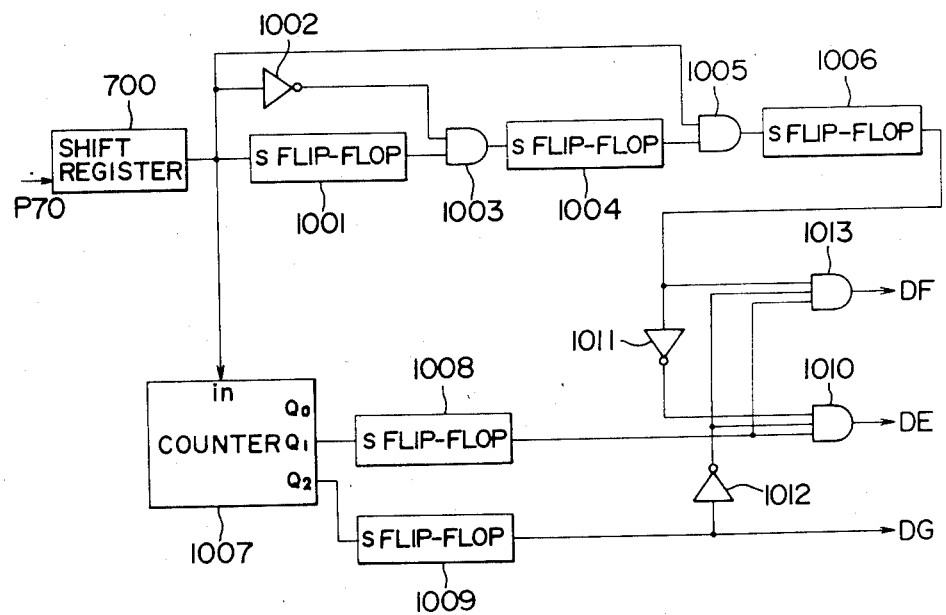

Next, FIG. 14 represents a circuit for detecting the case where logical values indicating a maximum coincidence of left and right images are stored in a plural stage of the shift register 700 in the distance measuring circuit system of FIG. 5. Such case suggests that the conclusion calculated as a correct distance through the distance measuring circuit is present plurally, and which is to take as a genuine one cannot be measured, as a matter of course, in the distance measuring circuit, however, it is necessary for optical instrument or user to measure it on a special decision by utilizing the distance measured result to adjust the focus of a camera lens. However, the optical instrument to receive a distance signal or the user must be acquainted at least with the fact that the measured result is present plurally, and hence it is apparently unsatisfactory that the minimum shift number or the longest distance in a plurality of measured results, or reversely the shortest distance only will be obtained as a measured result.

For the circuit illustrated in FIG. 14, a consideration has been paid so as to detect a presence of a plurality of measured results and a state of the distribution otherwise. In the drawing, 700 denotes the shift register shown in FIG. 5, contents stored therein are read from right on the read shift pulse P70 and then applied to the counter 800 working as the above-mentioned distance signal computation circuit which is shown in FIG. 5. A flip-flop 1001 receives an output from the shift register 700, and when the logical value "1" stored in a stage thereof is obtained, it is set accordingly. When an output from the next shift register becomes the logical value "0", AND conditions of the inversion output from an inverter and the output of the flip-flop 1001 are realized on an AND gate 1003, and the output becomes "1" to set the next flip-flop 1004. When the output of the shift register 700 becomes "1" again thereafter, AND conditions are realized on an AND gate 1005, and the next flip-flop 1006 is further set by its output "1". An output of the last flip-flop 1006 thus being "1" may suggest that a plural "1" is stored in the shift register 700 and "0" is present between them, namely there exist a plurality of distance measured results discontinuously. Then in the above description, a condition is such that the flip-flops 1001, 1004 and 1006 are all reset prior to receiving output signals from the shift register.

Further, a counter 1007 of FIG. 14 is a binary counter for counting how many pieces of "1" are stored in the shift register 700, namely how many distance measured results are present, and when the discrete value becomes 2, an output terminal $Q_1$ is "1" to set a flip-flop 1008. Further, when the discrete value becomes 4, an output terminal $Q_2$ on the next stage is "1" to set flip-flop 1009. An output of the flip-flop 1009 works as the signal DG, and the signal DG indicates that the distance measured result is present in four or over. Then, an inversion output of the flip-flop 1006 through an inverter 1011, an output of the flip-flop 1008 and an inversion signal of the signal DG through an inverter 1012 are applied to an AND gate 1010, therefore the output signal DE of the AND gate 1010 suggests that the distance measured result is present in two (output of the flip-flop 1008) up to and excluding four (inversion output of the flip-flop 1009) and that the distance measured result is continuous (inversion output of the flip-flop 1006). Similarly, the output of the flip-flop 1006, the output of the flip-flop 1008 and the inversion output of the flip-flop 1009 are applied to an AND gate 1013 for AND conditions, therefore the output DF suggests that the distance measured result is present in two up to and excluding four and is discontinuous (output of the flip-flop 1006).

The above information suggesting a presence of a plurality of distance measured results can be utilized in various forms. For example, in case a distance measured result is used for focusing on a camera, the result coming in four or over will be neglected as totally untrustworthy and a camera shutter is prohibited from operating by the above-mentioned signal DG, and a user can be acquainted to that effect on a known means indicating uncertainty of the distance measurement in a camera finder. Where the distance measured result is present in two up to and excluding four, namely in two or three, it can be determined which signal to employ for automatic focusing according to a property of the optical instrument. For example, where the measured result is present in two and continuous, focusing is made on a nearer distance, but where the measured result is present in three and continuous, the middle distance of the three can be taken up for focusing. Then, where the measured result is present in two and discontinuous, the intermediate and nearer distance of both the measured results can be employed for focusing. Be that as it may, such selection varies according to an optical characteristic of the instrument utilizing a distance measured result or a purpose of the user therefor, and hence it is easy to determine how to select beforehand according to the characteristic and the purpose. Then, a way of outputting a signal information when there exist a plurality of distance measured results is not necessarily limited to the above-mentioned mode, and it goes without saying that those skilled in the art are capable of selecting properly and so constituting within the gist of this invention.

As described above, this invention comprises providing a first means for detecting a condition wherein a distance cannot be measured practically from two image signal rows and generating a first signal to that effect, and a second means for detecting a presence of a plurality of staggers to bring both the image signal rows into a maximum coincidence and generating a second signal to that effect on a photoelectric distance measuring equipment, wherein a light emitted from an object to be subjected to a distance measurement is received by way of two optical paths different from each other spacially and images thus formed are received on a pair of photosensor arrays comprising a plurality of photosensors each to two image signal rows indicating a luminous intensity distribution in the images, both the image signal rows are compared successively as quantized and mutually shifted and then the distance to the object is measured from the stagger whereat both the image signal rows coincide maxumumly, therefore an erroneous measured result can be prevented from being utilized where the optical property of an object to be subjected to a distance measurement is not suitable originally for the distance measurement, and moreover a pertinent measured result which is to meet the purpose most definitely can be selected to utilization from among a plurality of measured results according to the second signal even in case the distance measurement is difficult from the measured result coming out plurally due to the optical property of the object. Particularly, an arrangement is such that the second signal indicating a presence of a plurality of measured results will be given separately from the first signal indicating the measurement being impracticable essentially, therefore an opportunity for utilizing the measured result can be increased effectively even in case only one kind of signal may lose a timing for distance measurement.

What is claimed is:

1. A distance measuring device comprising first and second receiving means for receiving radiation from an object along different optical paths, said receiving means generating first and second groups of signals, quantizing means for quantizing said signals, said quantizing means generating first and second quantized data rows responsive to said first and second groups of signals, means for shifting at least one of said first and second rows, means for correlating a coincidence between said first and second rows each time after said shifting is completed, means for obtaining at least one shift rate which indicates a maximum coincidence, and judging means for judging a condition wherein said first and second rows are not reliable for obtaining the distance, said condition being detected based on said first group of signals which have first values and second group of signals which have second values, said first and second values corresponding to first and second distributions of said radiation, said judging means generating a first signal when said condition is detected.

2. A distance measuring device comprising, first and second receiving means for receiving radiation from an object along different optical paths, said receiving means generating first and second groups of signals, quantizing means for quantizing said signals, said quantizing means generating first and second quantized data rows responsive to said first and second groups of signals, means for shifting at least one of said first and second rows, means for correlating a coincidence between said first and second rows each time after said shifting is completed, means for obtaining at least one shift rate which indicates a maximum coincidence and judging means for judging a condition wherein said shift rate indicating said maximum coincidence is plural, said judging means generating a signal when said condition is detected.

3. The device of claim 2, wherein said judging means includes means for detecting a number of said plural not being smaller than a first predetermined number and being smaller than a second predetermined number.

4. The device of claim 3, wherein said first number is two and said second number is four.

5. The device of claim 2, wherein said judging means includes means for detecting said shifting rates being discontinuous.

6. The device of claim 2, wherein said judging means includes means for detecting said shifting rates being continuous.

7. The device of claim 2, wherein said judging means includes means for detecting a number of said plural being greater than a predetermined number.

8. The device of claim 7, wherein said predetermined number is four.

9. The device of claim 7, wherein said signal generated by said judging means prevents the device from transfering a distance signal.

10. The device of claim 2, wherein said judging means includes a shift register having at least a number of stages corresponding to a number of said shifting, said shift register being adapted to store logical values in stages corresponding to said shift rates, means for counting said logical values outputted from said shift register responsive to a read pulse, and means for judging whether or not said shift rate is plural.

11. The device of claim 2, further comprising means for storing and outputting at least two said shift rates.

12. The device of claim 1 wherein said judging means includes detecting means for detecting a maximum value of said first and second values, comparing means for comparing said value with a predetermined level, and means for judging said condition when said maximum value is not greater than said predetermined level.

13. The device of claim 1 wherein said judging means includes detecting means for detecting first and second maximum values of said first and second values respectively, comparing means for comparing said first and second maximum values with a predetermined level, and means for judging said condition when both of said first and second maximum values are not greater than said predetermined value.

14. The device of claim 1 wherein said judging means includes detecting means for detecting a first difference between a maximum value and a minimum value of said first values and a second difference between a maximum value and a minimum value of said second values, and means for judging said condition when said first and second differences are not greater than a predetermined level.

15. The device of claim 1 whrein said judging means includes detecting means for detecting a first difference between a maximum value and a minimum value of said first values and a second difference between a maximum value and a minimum value of said second values, means for judging said condition when at least one of said first and second difference is not greater than a predetermined level.

16. The device of claim 1 wherein said judging means includes detecting means for detecting first and second maximum values of said first and second values respectively, and first and second minimum values of said first and second values, respectively, and means for judging said condition when said first maximum value is not greater than said second minumum value or said second maximum value is not greater than said first minimum value.

17. The device of claim 1, wherein said first and second groups of signals are image pulses each pulse-width of which corresponds to said distributions, said judging means detecting at least one of maximum pulse-widths and minimum pulse-widths and judging said first condition based on said pulse-width.

18. The device of claim 17, wherein said judging means includes logical gate means which detects at least one of a terminal of the longest pulse and a terminal of the shortest pulse.

19. The device of claim 18, wherein each of said pulse-widths decreases in accordance as intensity of said radiation increases, said logical gate means includes an OR gate for detecting said terminal of the shortest pulse and AND gate for detecting said terminal of the longest pulse.

20. The device of claim 1, wherein said judging means includes means for detecting a start of supplying electric power to the device, and means for generating said first signal during a first measurement of the distance after said start.

21. The device of claim 1, wherein said first signal prevents the device from transfering a distance signal.

22. The device of claim 1, wherein said judging means includes detecting means for detecting a difference between a maximum value of said first and second values and a minimum value of said first and second values, and means for judging said condition when said difference is not greater than a predetermined level.

23. The device of claim 1, wherein said judging means includes detecting means for detecting a first difference between a maximum value and a minimum value of said first values and a second difference between a maximum value and a minimum value of said second values, and means for judging said condition when said first and second differences are not greater than a predetermined level.

24. The device of claim 1, wherein said judging means includes detecting means for detecting a first difference between a maximum value and a minimum value of said first values and a second difference between a maximum value and a minimum value of said second values, and means for judging said condition when at least one of said first and second differences is not greater than a predetermined level.

25. A distance measuring device comprising: first and second receiving means for receiving radiation from an object along different optical paths, said receiving means generating first and second groups of signals, quantizing means for quantizing said signals, said quantizing means generating first and second quantized data rows responsive to said first and second groups of signals, means for shifting at least one of said first and second rows, means for correlating a coincidence between said first and second rows each time after said shifting is completed, means for obtaining at least one first shift rate which indicates a maximum coincidence and judging means for detecting a condition wherein said first shift rate is plural, said judging means generating a signal when said condition is detected, means for obtaining at least one second shift rate which indicates a maximum coincidence and means for storing said first shift rate and second shift rate.

* * * * *